US006350962B1

(12) United States Patent
Beltrandi

(10) Patent No.: US 6,350,962 B1
(45) Date of Patent: Feb. 26, 2002

(54) CUTTING MACHINE FOR FORMING FRACTURE LINES ALLOWING SEPARATION OF TAMPER-EVIDENT RINGS FROM PLASTIC CAPS

(75) Inventor: Dario Beltrandi, Imola (IT)

(73) Assignee: Sacmi Cooperativa Meccanici Inola S.c.r.l., Imola (IT)

( * ) Notice: Subject to any disclaimer, the term of this patent is extended or adjusted under 35 U.S.C. 154(b) by 0 days.

(21) Appl. No.: 09/492,756

(22) Filed: Jan. 27, 2000

(30) Foreign Application Priority Data

Jan. 28, 1999 (IT) ........................................ B099A0040

(51) Int. Cl.[7] ................................................ B23K 26/36
(52) U.S. Cl. .................................................. 219/121.68
(58) Field of Search ........................ 219/121.67, 121.68, 219/121.69, 121.7, 121.71, 121.72

(56) References Cited

U.S. PATENT DOCUMENTS 4,583,854 A * 4/1986 Lozar ......................... 356/237
4,742,206 A * 5/1988 Dietterich et al. ..... 219/121.67
5,912,186 A * 6/1999 Yoshino et al. ............. 438/708

* cited by examiner

*Primary Examiner*—Samuel M. Heinrich
(74) *Attorney, Agent, or Firm*—Guido Modiano; Albert Josif; Daniel O'Byrne

(57) ABSTRACT

A cutting machine for forming fracture lines in the cylindrical wall of plastic caps to facilitate the separation of a tamper-evident ring, including at least one cap support which rotates about an axis thereof and a laser beam emitter arranged, with respect to the support, so as to provide a laser beam that strikes the cylindrical wall of the cap, the emitter being activated and deactivated in accordance with the rotary motion of the cap, so as to form in the cylindrical wall of the cap a plurality of cuts alternated with short intact portions, which form a fracture line allowing the separation of the tamper-evident ring from the cup.

8 Claims, 4 Drawing Sheets

CUTTING MACHINE FOR FORMING FRACTURE LINES ALLOWING SEPARATION OF TAMPER-EVIDENT RINGS FROM PLASTIC CAPS

BACKGROUND OF THE INVENTION

The present invention relates to a machine for cutting the cylindrical wall of tamper-evident plastic caps in order to form a fracture line which is suitable to facilitate the separation of a tamper-evident ring during the removal of the cap from the container to which it has been applied.

Plastic caps are known which are provided with a tamper-evident ring, i.e., with a ring which is fixed below the cup of the cap by means of bridges which break during the initial unscrewing of the cap and allow to determine whether the cap has been tampered with or not.

In some types of cap, the tamper-evident ring and the corresponding bridges for coupling to the cup are obtained by molding together with the cap itself.

In other types, the ring is molded monolithically with the cup and is rendered separate from said cup at a later stage by means of peripheral cuts, so that the tamper-evident ring remains attached to the cap only with very short intact portions which constitute said bridges.

In some conventional machines, the cuts in the cylindrical wall of the cup are performed by means of a cutter with a circular cutting edge, against which the caps are rolled. A plurality of appropriately spaced notches are formed in the cutting edge and form the bridges.

These conventional machines suffer the drawback that replacing the cutter, for example due to wear or breakage or due to requirements imposed by the structure of the cap, is a highly complex and time-consuming operation.

SUMMARY OF THE INVENTION

The aim of the present invention is to obviate the above-cited drawbacks of conventional machines, by providing a machine for cutting tamper-evident rings which does not wear and can be easily adapted to different cutting methods and to different cap shapes.

Within the scope of this aim, an object of the present invention is to achieve the above aim by providing a machine which is simple, relatively easy to manufacture, safe in use, effective in operation, and relatively modest in cost.

This aim and this object are both achieved by the present machine for cutting the cylindrical wall of the cup of plastic caps in order to form a fracture line which is suitable to facilitate the separation of a tamper-evident ring, characterized in that it comprises at least one cap support which rotates about an axis, and a laser beam emitter arranged, with respect to said support, so that said beam strikes said cylindrical wall of the cap, said emitter being activated and deactivated in accordance with the rotary motion of the cap, so as to form in the cylindrical wall of the cap a plurality of cuts alternated with short intact portions, which form a fracture line allowing the separation of said tamper-evident ring from said cup.

BRIEF DESCRIPTION OF THE DRAWINGS

Further characteristics and advantages of the machine according to the present invention will become apparent from the following detailed description of a preferred but not exclusive embodiment, illustrated only by way of non-limitative example in the accompanying drawings, wherein.

DESCRIPTION OF THE PREFERRED EMBODIMENTS

Figure 1:
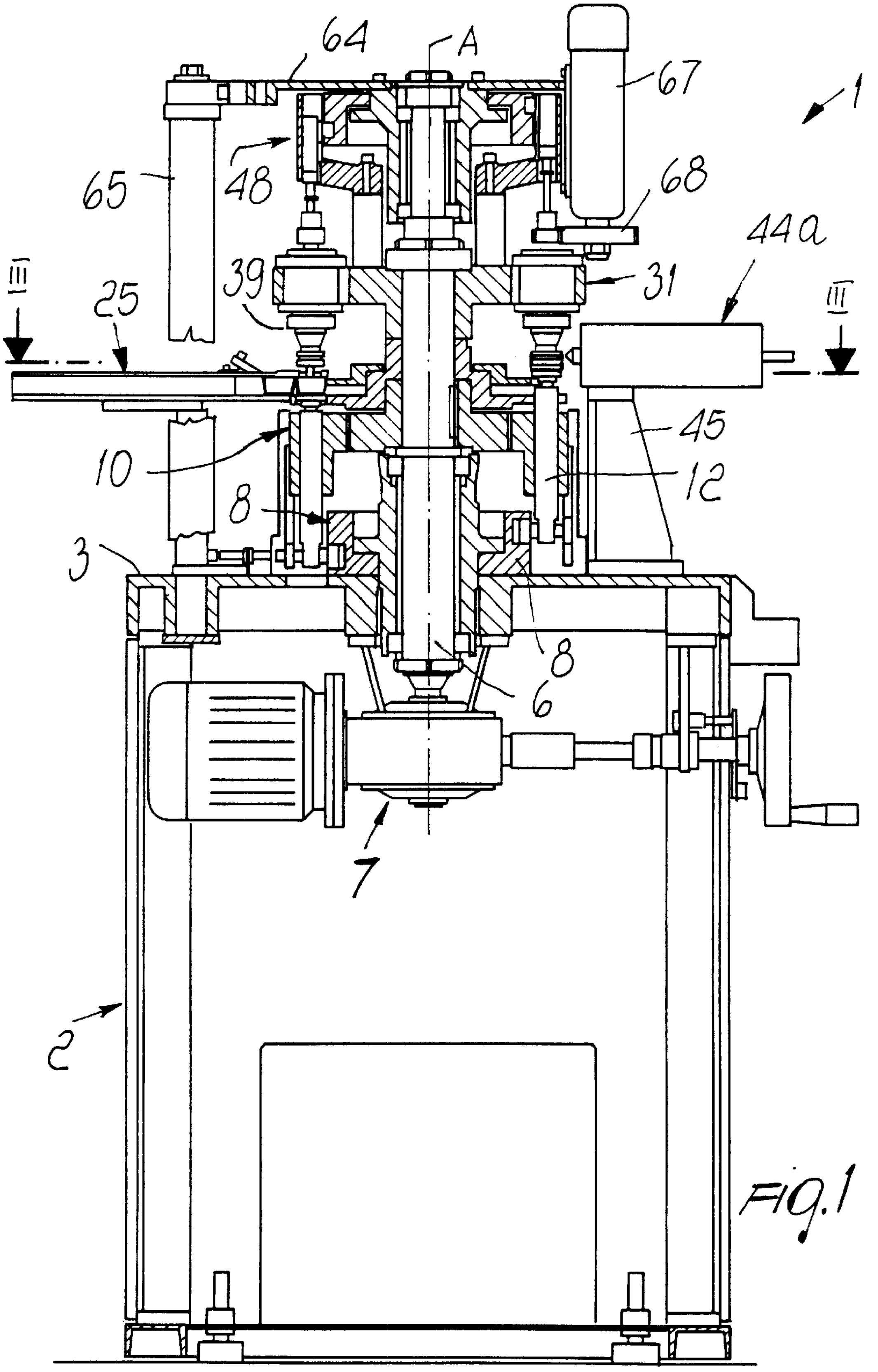
FIG. 1 is a sectional view of a cutting machine, taken along a vertical plane.

With particular reference to the above figures, the machine is substantially constituted by a carousel 1 which can revolve on a footing 2 which is provided with a horizontal worktable 3 in which a centering opening for a sleeve 4 having a vertical axis A is formed centrally.

A shaft 6 is supported in the sleeve 4 so that it can rotate by means of bearings 5 and rises from the worktable 3; below said worktable, said shaft is connected to the output of a gearmotor 7 which is accommodated within the footing 2 and is fixed under the worktable 3. The gearmotor 7 is suitable to impart an intermittent rotation to the shaft 6.

A drum 8 is fixed on the worktable 3, concentrically to the sleeve 4 and between said worktable and a flange of the sleeve, and is externally provided with a slot which forms an axial cam 9.

A rotating cap conveyor is fitted on the shaft 6, above the sleeve 4, and comprises a flange 10 which is keyed onto the shaft 6 and in which cylindrical seats 11 are provided on a diameter which is greater than the outside diameter of the drum 8.

The cylindrical seats 11 are mutually angularly equidistant, and respective spindles 12 are guided axially therein; said spindles are crossed, in a downward region, by pins 13 which are radial with respect to the axis A.

Respective bearings 14, 15 are supported at the opposite ends of the pivots 13. The bearings 14 are internal with respect to the spindles 12 and engage in the cam 9, so that by turning the shaft 6 they force the spindles 12 to perform movements which are determined by the shape of the cam 9. The bearings 15 instead engage in vertical slots formed in strips 16 which protrude downward from the peripheral region of the flange 10 with which they are rigidly coupled. In this manner, the spindles are prevented from rotating during axial movements.

The tops of the spindles 12 have cylindrical cavities in which bearings 17 rotatably support respective stems 18. The stems 18 protrude upward above the flange 10, and a circular plate 19 is rigidly coupled to their upper end.

The plates 19 are aligned with respective circular seats 20 which are formed in a disk 21 which is fixed on a radial expansion of a collar 22 which is fitted on the shaft 6 and is rigidly rotationally coupled to the flange by means of pins **22*a***.

Moreover the collar 22 has a shoulder on which a second disk 23 is fixed; said second disk lies flat and parallel with respect to the disk 21. The disk 23 is provided with peripheral recesses 24 which are open toward the outside and are shaped like circular arcs, so that the disk 23 assumes the appearance of a star.

The recesses 24 have a diameter which is complementary to the diameter of the caps C to be cut and are aligned with respective plates 19, so as to provide seats in which the caps C rest on plates 19 and are retained peripherally by the edge of the recesses 24.

Figure 4:
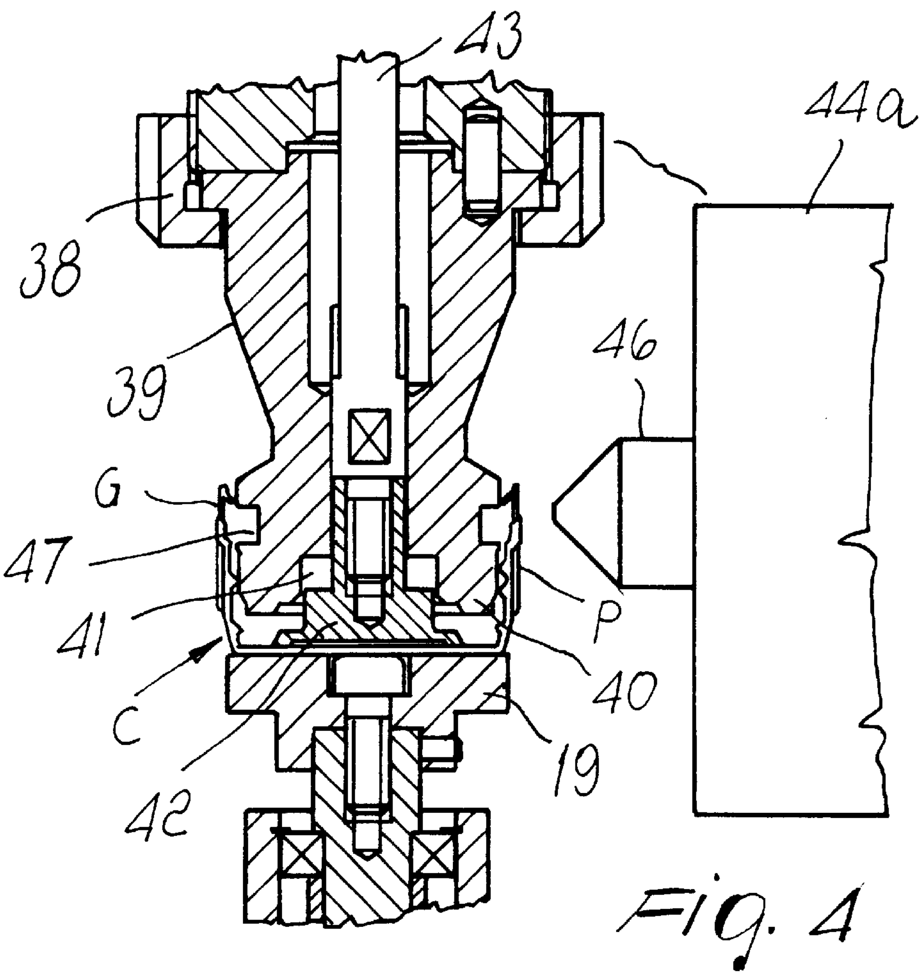
FIGS. 4 and 5 are enlarged-scale views of two details of the cutting device.

As shown more clearly by FIG. 4, the caps C comprise a cup which has a cylindrical wall P which is internally threaded and protrudes axially, forming the tamper-evident ring G.

The caps C are conveyed into the recesses 24 by means of a feeder channel 25 which is composed of a bottom 26 which is co-planar to the disk 21 and of two side walls 27, 28; the side wall 28 runs circumferentially around the star 23 with a portion 29, so as to close the recesses 24 along a certain extent in the direction of rotation F of the shaft 6, at least until the caps C have been locked against the plates 19 by means which are generally designated by the reference numeral 30.

Figure 2:
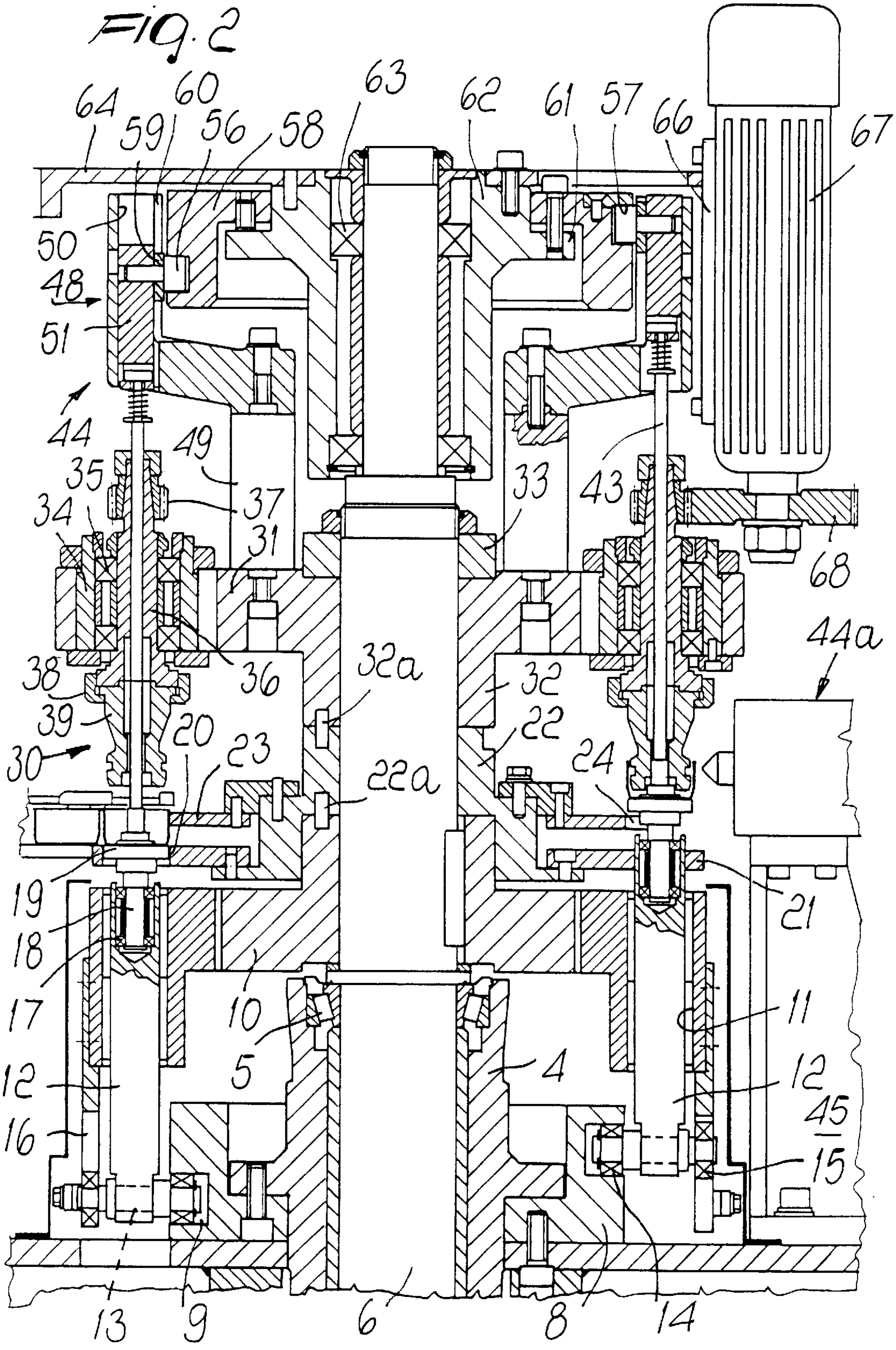
FIG. 2 is an enlarged-scale view of the upper part of the machine of FIG. 1.

Said means comprise (see FIG. 2) a flange 31 which is fitted on the shaft 6 and is provided with a collar 32 which is rotationally rigidly coupled to the collar 22 by means of axial coupling pins 32*a* and is locked axially by a ring 33.

The flange 31 has a plurality of axial holes which are vertically aligned with the plates 19 and accommodate bushes 34 which internally rotatably support, by means of bearings 35, hollow shafts 36 whose opposite ends protrude upward and downward out of the bushes 34.

A gear 37 is rigidly coupled to the upper end of the shafts 36, while the lower end is shaped so as to allow, by means of a ring 38, the locking of a tang 39 which is coaxial to the shaft 36.

The tang 39, see FIG. 4 in particular, comprises a substantially cylindrical head 40 which can be inserted with minimal play in the cap C.

A hollow 41 is formed frontally in the head 40 and accommodates a complementarily shaped plate 42.

The plate 42 is fixed to a stem 43 which runs axially through the tang 39 and the shaft 36 and is coupled, in an upward region, to actuation elements generally designated by the reference numeral 44. During the operation of the machine, said elements, by activating the stems 43, cause the plates 42 to protrude from the recesses 41, so as to secure the bottom of the caps C onto the plates 19 and lift the caps to a chosen level in order to produce a fracture cut between the tamper-evident ring G and the wall P of the cap by means of a laser-beam device 44*a* which is installed on the worktable 3 with the aid of a bracket 45. Conveniently, in order to provide greater assurance in cutting, the head 40 of the tang 39 has an annular slot 47 at the level of the emitter 46 of the laser beam.

The elements 44 for actuating the stems 43 comprise a cylinder 48 which is supported coaxially to the shaft 6 by posts 49 by means of which it is fixed to the flange 31.

Figure 5:
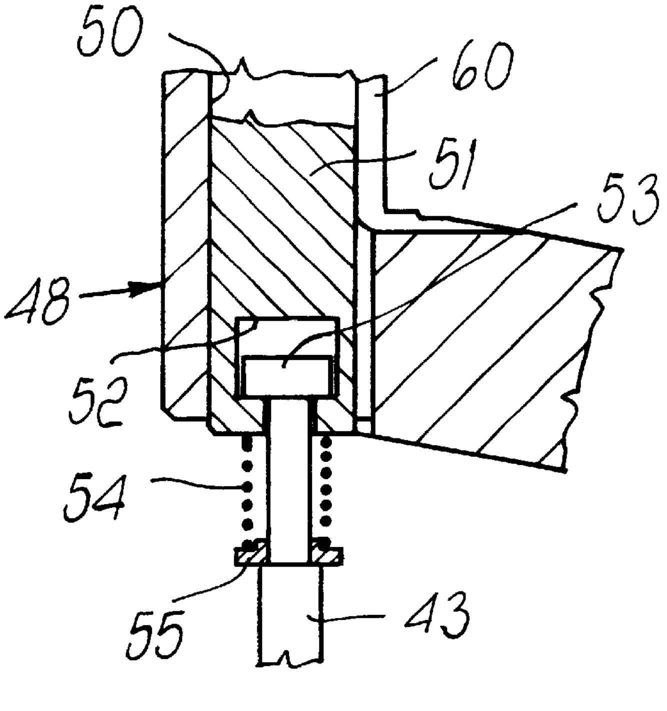

Seats 50 are formed in the cylinder 48 and are coaxial to the hollow shafts 36; sliders 51 are guided therein and are connected to the stems 43 by elastic couplings, shown more clearly in FIG. 5. Each coupling is provided with a notch 52 which has a T-shaped cross-section, is formed diametrically at the lower end of the respective slider, and is engaged by the head 53 of a mushroom-shaped portion formed at the top of the stem 43. The stem 53 is not as high as the notch 52 is deep, so that the stem 43 can perform axial movements with respect to the slider 51.

The head 53 is actuated into abutment against the undercuts of the notch 52 by a spring 54 which is arranged on the stem 43 and acts between the slider 51 and a shoulder 55 of said stem.

A roller 56 is fixed in the sliders 51 so as to cantilever out toward the shaft 6 and engages a cam 57 formed in the outer wall of a stationary drum 58 which is internally concentric to the cylinder 48. The cam 57 actuates the axial movements of the sliders 51 and, in order to prevent the rotation thereof in the respective seat 50, on the supporting pivot of each roller 56 there is a ring 59 which slides in a slot 60 formed in the internal wall of the seat 48.

The drum 58 is centered and fixed on a flange 61 of a sleeve 62 in which bearings 63 rotatably support the top of the shaft 6. The flange 61 is fixed below a bracket 64 which rises above the drum 58.

The bracket 64 is fixed to the top of an upright 65 which rises from the worktable 3 of the footing. A vertical plate 66 is rigidly coupled to the bracket 64 in a diametrically opposite position with respect to the upright 65, and a motor 67 having a vertical axis is coupled to said plate by means of a flange. The shaft of the motor 67 protrudes downward, and a pinion 68 is keyed thereon; said pinion lies at the level of the gears 37 and at a radial distance from the shaft 6 which allows it to make tangential contact and mesh with the gears 37.

Figure 3:
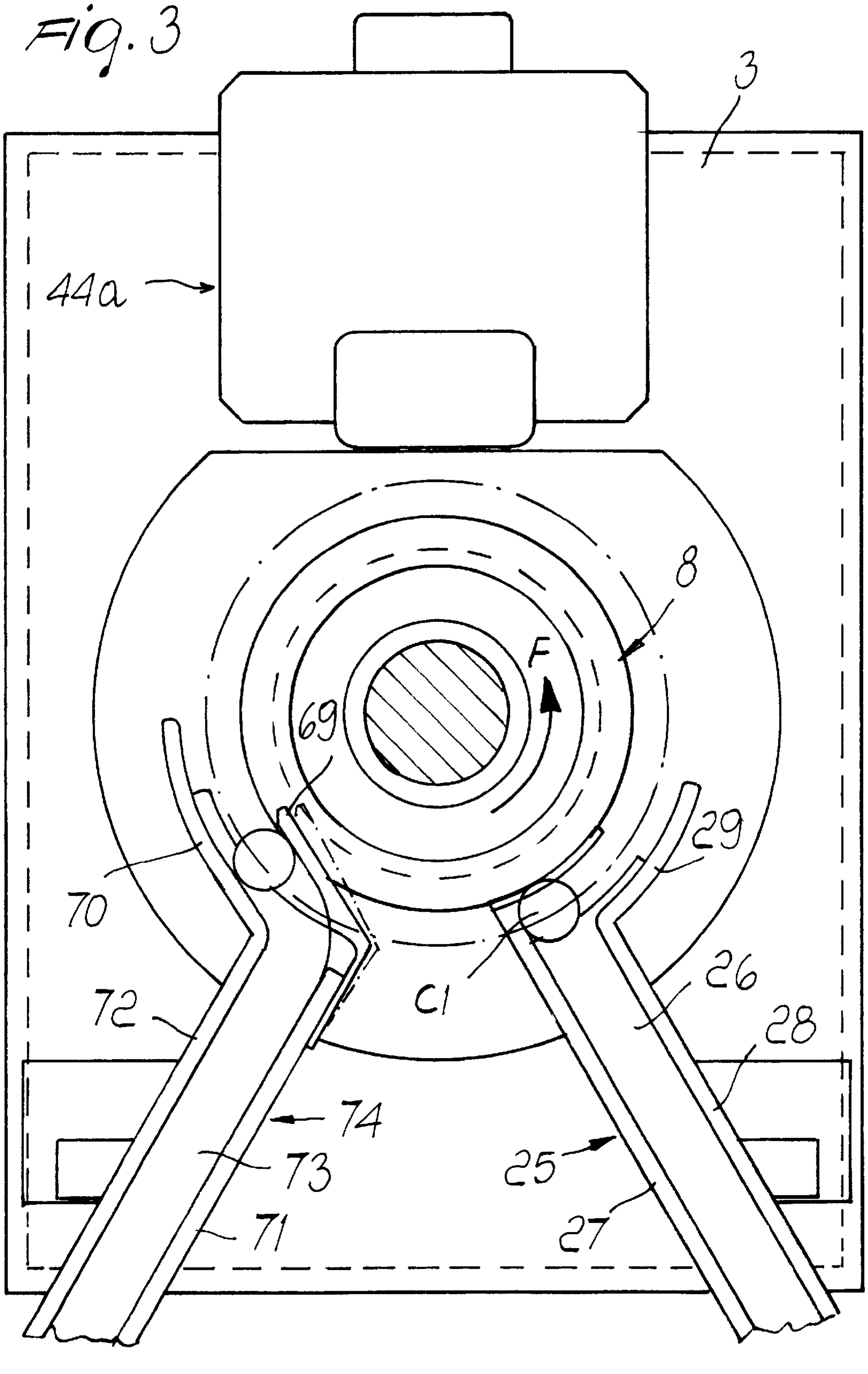
FIG. 3 is a sectional plan view of FIG. 1, taken along the plane III—III.

The operation of the above-described apparatus is as follows. The caps C, by means of driving means which are not shown (for example with the aid of an air jet or by gravity), are conveyed along the channel 25, where they form a stack of caps. In the stopped position of the carousel 1, the front cap, designated by C1 in FIG. 3, engages in a recess 24 of the star 23 and rests on the plate 19.

As soon as the intermittent rotation of the carousel 1 in the direction F is activated, and before the cap C1 leaves the portion 29 of the side wall 28, the rod 43 is actuated so as to lower, consequently locking the cap C1 against the plate 19 by means of the plate 42. Since the cap C1 is now centered with respect to the head 40, the subsequent lifting of the plates 19, 42, actuated by the cams 9 and 57, causes the cap C1 to fit onto the head 40 of the tang 39 up to the level at which the region connecting the tamper-evident ring G and the cup lies at the annular slot 47 of the head 40.

When a cap C1 arrives in front of the laser emitter 46, the carousel 1 stops and the gear 37 of the corresponding tang 39, on which the cap is centered, meshes with the pinion 68 of the motor 67.

The rotation of the tang 39, actuated by the motor 67, causes the rotation of the cap C in front of the emitter 46, so that the emitted laser beam can strike the cap C1 circumferentially between the tamper-evident ring G and the cup, forming a fracture line which is composed of circular cuts interrupted by bridges.

As the rotation of the carousel continues, the cams 9 and 57 actuate the descent of the spindle 12 and of the stem 43. In particular, the descent of the stem 43 causes the separation of the cap C1 from the head 40 and its release between the portions 69 and 70, which are tangent to the star 23, of a pair of side walls 71 and 72 which, together with a bottom 73, form an exit channel 74 for the caps. It should be noted that the portion 69 fits between the disks 21 and 23 in order to extract the caps which, when the plates 19 have descended into the respective seats 24, are released and can move freely.

The rotation and cutting cycle is repeated for each cap in the above described manner.

A prerogative of the above-described machine is that the emitted laser beam can be controlled according to various requirements, extending or shortening the cutting arcs and therefore the bridges that remain in order to join the tamper-evident ring to the cup.

Another advantage consists in that the machine can be easily adapted to 30 the various types of cap by replacing the tangs 39 after unscrewing the plate 42 from the stems 43 and the ring 38.

The disclosures in Italian Patent Application No. BO99A000040 from which this application claims priority are incorporated herein by reference.

What is claimed is:

1. A cutting machine for forming fracture lines in the cylindrical wall of a plastic cap to facilitate separation of a tamper-evident ring of the cap, comprising:

a worktable;

at least one cap support, mounted at said worktable, for supporting a cap to be cut for formation of said fracture lines, said cap support being rotatable along with the cap about an axis thereof;

a cap conveyor for conveying caps to be cut at a cutting position;

locking and centering means for locking a cap to be cut, in a centered position, at said at least one cap support;

and a laser beam emitter supported at said worktable at said cutting position, with respect to said at least one cap support, so to provide a laser beam that strikes the cylindrical wall of the cap during rotary motion thereof, said emitter being controllably activated and deactivated in accordance with working requirements and the rotary motion of said cap, so as to form in the cylindrical wall of the cap a plurality of cuts alternated with short intact portions constituting bridges, said plurality of cuts and bridges forming a fracture line which allows the separation of said tamper-evident ring from said cup.

2. The machine of claim 1, further comprising: a shaft rotatable about a vertical axis and actuatable so as to move intermittently; a carousel mounted on said shaft; a feeder channel; and first and second cam actuation means; and wherein said cap conveyor is rigidly coupled to said shaft and is provided with seats for accommodating the caps that arrive from said feeder channel said at least one rotating cap support being associated with each said seat and being composed of a lower supporting plate for the cap accommodated in said seat and of an element for retaining said cap in said seat, said plate and said element being vertically aligned and being actuated by said first cam means between a spaced position for arrangement, on said plate, of a cap that arrives from said feeder channel and a closer position for locking said cap between said plate and said element, and by second cam means which are adapted to actuate said plate and said element so as to arrange, in front of said laser beam emitter, a region that connects said tamper-evident ring and said cup in order to form the cuts and the bridges that constitute said fracture line.

3. The machine of claim 2, wherein said cap conveyor comprises a first disk which is fixed on said shaft, a second disk which is fixed on said shaft above said first disk and is provided with recesses which open outward and have a diameter which is complementary to the diameter of the caps, circular openings being formed in said first disk and being vertically aligned with said recesses in order to accommodate said lower plates in a position for receiving the caps that arrive from said feeder channel, and wherein the machine further comprises a flange which is rigidly coupled to said shaft below said first disk; stems rotatable coaxially in said spindles which are guided vertically in said flange, said plates being mounted at a top part of respective ones of said stems, and said spindles being associated with an axial actuation cam which is concentric to said shaft.

4. The machine of claim 3, comprising a flange which is rigidly coupled to said shaft above said cap conveyor, said retention elements being mounted on said flange, and each retention element comprising: a hollow shaft which is supported so as to be rotatable in said flange coaxially to a respective said lower plate; a tang which is rigidly coupled to the lower end of said shaft and is provided with a head whose shape is such that it can engage with minimal play in a respective cap which rests on a respective said lower plate; a stem which is driven Through said hollow shaft, said tang and said head being crossed axially by said stem; a gear which is rigidly coupled to an upper end of said hollow shaft; a motor provided with a pinion which is suitable to mesh in succession with each gear of a retention element, in order to produce rotation of said shaft and said tang at said laser beam emitter; a locking plate provided at a lower end of said stem; cam means for controlling an upper end of said stem, said cam means being adapted to actuate in movement said locking plate inside the cap that rests on said lower plate of said conveyor in order to keep the cap locked during rotation in front of the laser beam emitter and to remove the cap from said head after producing said fracture line.

5. The machine of claim 4, wherein said head is provided, at a level of said laser beam emitter, with a peripheral slot.

6. The machine of claim 5, comprising an elastic coupling, said stem being connected to said upper cam means by way of said elastic coupling.

7. A cutting machine for forming fracture lines in the cylindrical wall of a plastic cap to facilitate separation of a tamper-evident ring of the cap, comprising:

a worktable;

at least one cap support, mounted at said worktable, for supporting a cap to be cut for formation of said fracture lines, said cap support being rotatable along with the cap about an axis thereof;

locking and centering means for locking a cap to be cut, in a centered position, at said at least one cap support;

a shaft mounted at said worktable so as to be intermittently actuatable in rotation about a vertical axis; a carousel mounted on said shaft to intermittently move caps to be locked and centered at said cap support to a cutting position;

a cap conveyor for conveying caps to be cut to the cutting position, said cap conveyor being rigidly coupled to said shaft;

and a laser beam emitter supported on said worktable at said cutting position, with respect to said at least one cap support, so as to provide a laser beam that strikes the cylindrical wall of the cap during rotary motion thereof, said emitter being controllably activated and deactivated in accordance with working requirements and the rotary motion of said cap, so as to form in the cylindrical wall of the cap a plurality of cuts alternated with short intact portions constituting bridges, said plurality of cuts and bridges forming a fracture line which allows the separation of said tamper evident ring from said cup.

8. A cutting machine for forming fracture lines in the cylindrical wall of a plastic cap to facilitate separation of a tamper-evident ring of the cap, comprising:

a worktable;

at least one cap support, mounted at said workable, for supporting a cap to be cut for formation of said fracture lines, said cap support being rotatable along with the cap about an axis thereof;

locking and centering means for locking a cap to be cut, in a centered position, at said at least one cap support;

a shaft mounted at said worktable so as to be intermittently actuatable in rotation about a vertical axis; a carousel mounted on said shaft to intermittently move caps to be locked and centered at said cap support to a cutting position;

a cap conveyor for conveying caps to be cut to the cutting position, said cap conveyor being rigidly coupled to said shaft;

a feeder channel arranged so as to feed cap to be cut to said carousel; and a laser beam emitter supported on said worktable at said cutting position, with respect to said at least one cap support, so as to provide a laser beam that strikes the cylindrical wall of the cap during rotary motion thereof, said emitter being controllably activated and deactivated in accordance with working requirements and the rotary motion of said cap, so as to form in the cylindrical wall of the cap a plurality of cuts alternated with short intact portions constituting bridges, said plurality of cuts and bridges forming a fracture line which allows the separation of said tamper-evident ring from said cup.

* * * * *